April 12, 1955     C. U. BALLARD     2,705,969

TEMPERATURE COMPENSATOR FOR A CLOSED HYDRAULIC SYSTEM

Filed Dec. 7, 1950

INVENTOR.
CHARLES U. BALLARD
BY
Hazard & Miller
ATTORNEYS

United States Patent Office 2,705,969
Patented Apr. 12, 1955

2,705,969

TEMPERATURE COMPENSATOR FOR A CLOSED HYDRAULIC SYSTEM

Charles U. Ballard, Inglewood, Calif.

Application December 7, 1950, Serial No. 199,648

12 Claims. (Cl. 137—87)

This invention relates to telemotor systems and particularly to compensators therefor.

Explanatory of the present invention, the conventional or usual telemotor system has some form of actuater connected to a motor by means of two conduits or lines each of which is filled with a liquid. When the actuator is operated in one direction the liquid in one of the conduits or lines is forced toward the motor to actuate it and liquid in the other conduit or line is merely returned therethrough from the motor to the actuator. When the actuator is operated in the opposite direction the reverse situation occurs.

Telemotor systems are frequently subjected to considerable temperature variation. This is particularly true where the telemotor system is installed on aircraft which may be flying through sub-zero temperatures at high altitudes and then relatively quickly brought to normal temperatures on landing. A quick elevation in temperature will, of course, bring about an expansion of the liquid in the conduits or lines between the actuator and the motor and some provision is required to relieve the pressure in the lines occasioned by such quick expansion. Conversely, if the telemotor system is subjected to quick cooling, provision must be made for returning liquid to the lines to compensate for the contraction of the liquid occasioned by the cooling. Although liquid is bled from the lines when the temperature of the system is raised and is returned to the lines when the temperature of the system is cooled, it is necessary to maintain the lines in such a condition that pressure may be transmitted through either of them from the actuator to the motor at all times.

Heretofore compensators for telemotor systems have been devised which will enable liquid to pass from either line to the compensator reservoir only when the pressure in both lines exceeds a predetermined degree. Such devices also enable liquid to be returned from the compensator reservoir to the lines whenever the pressure in the reservoir exceeds that of either line. In the compensators heretofore developed no attempt has been made to return fluid to that line or conduit from which it has been received in direct proportion to the amount that has been received. Instead, the compensators heretofor developed served merely to return liquid to that conduit or line which at the moment of return had the least pressure. Consequently the position of the actuator with relation to the motor could ultimately be altered by the compensator returning more liquid to one line than to the other. Thus, if the actuator were operated by a steering wheel and the motor operated a rudder, for example, if the compensator returned liquid while the aircraft were flying under right rudder, the liquid would be returned to the idle or returning line and if this occurred to any considerable extent or the return under these conditions occurred repeatedly, the relationship between the steering wheel and the rudder would be altered.

An object of the present invention is to provide an improved compensator for telemotor systems of this character which will admit liquid from either line only when the pressures in both lines exceed a predetermined degree as is occasioned by a rise in temperature and which will enable the liquid to be returned to the lines whenever the pressure in the lines decreases, and which is so designed that the liquid will be returned from the compensator into that line from which the compensator has received the most liquid. In this manner, by returning liquid from the compensator to the line from which it has received the most liquid, the relationship or setting of the actuator with relation to the motor can be maintained.

Another object of the invention is to provide an improved and highly simplified construction for controlling ingress of liquid from a line into the compensator so that it will be admitted only when the pressure in both lines exceeds a predetermined degree and which enables liquid to be returned to the line whenever the pressure in the compensator exceeds the pressure existing in the line.

With the foregoing and other objects in view, which will be made manifest in the following detailed description and specifically pointed out in the appended claims, reference is had to the accompanying drawings for an illustrative embodiment of the invention, wherein:

Figure 1:
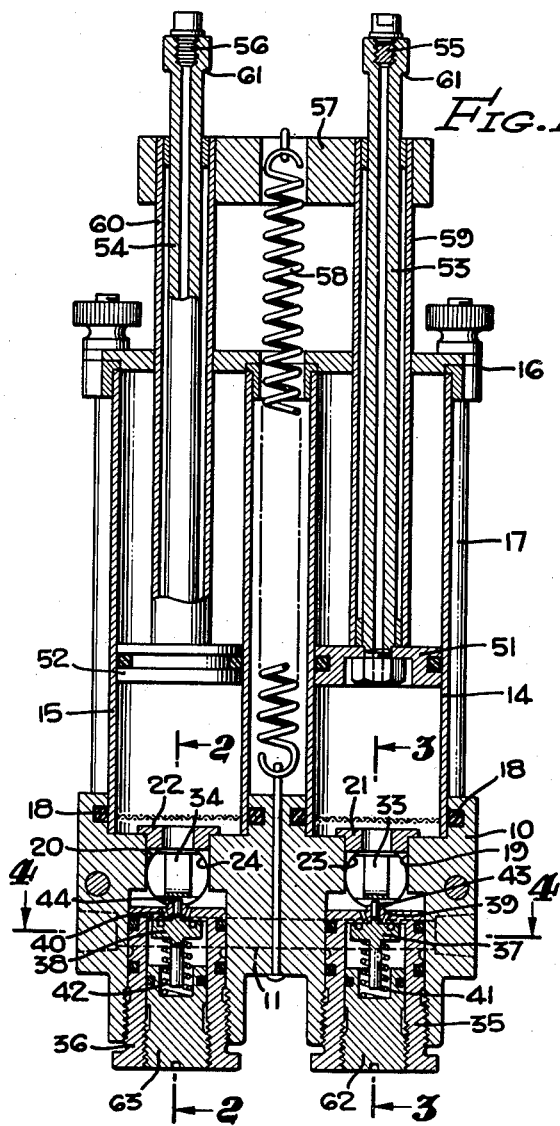
Figure 1 is a sectional view through the compensator embodying the present invention.

Referring to the accompanying drawings wherein similar reference characters designate similar parts throughout, the compensator embodying the present invention consists of a base 10 through which there are two longitudinally extending bores or passages 11 and 12. These passages are threaded or otherwise equipped at their ends, as indicated at 13, for attachment of the base in the two conduits or lines that connect the actuator of a telemotor system with its motor. In other words, passage 11 may be regarded as forming a part of the conduit leading from one side of the actuator to one side of the motor and passage 12 may be regarded as forming a part of the other conduit connecting the other side of the actuator with the other side of the motor. When the actuator is operated in one direction, liquid in one conduit including the passage 11, for example, may be forced from the actuator toward the motor and have its pressure increased. Under such circumstances liquid in the other conduit merely returns from the motor through the passage 12 to the actuator without any substantial increase in pressure. Conversely, if the actuator is operated in the opposite direction, passage 12 may be conducting liquid under high pressure from the actuator to the motor and passage 11 serving merely as a return. If the system is subjected to a substantial increase in temperature the expansion of the liquid in both lines may involve an increase in pressure in both of the passages 11 and 12 which must be relieved. On the other hand, if the system is subjected to a decrease in pressure contraction of the liquid in the lines involves a decrease in pressure in both passages 11 and 12 and liquid should be returned from the compensator to either or both of the lines. At all times, regardless of whether liquid is allowed to escape from a line into the compensator or be returned from the compensator to the lines, each line must be capable of transmitting pressure from the actuator to the motor.

Figure 2:
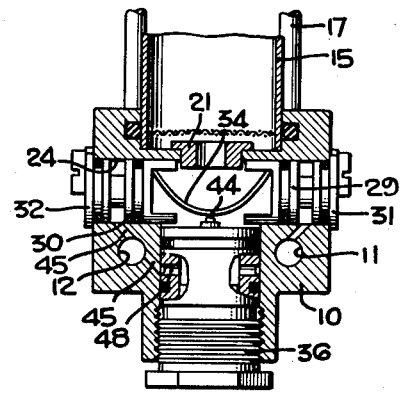
Fig. 2 is a partial view in vertical section taken substantially upon the line 2—2 upon Fig. 1.
Figure 3:
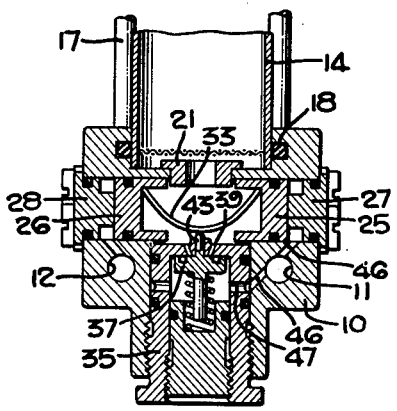
Fig. 3 is a partial view in vertical section taken substantially upon the line 3—3 upon Fig. 1.
Figure 4:
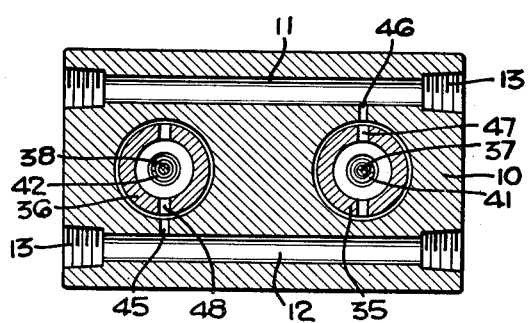
Fig. 4 is a horizontal section taken upon the line 4—4 upon Fig. 1.

On the top of the base 10 there are two cylinders 14 and 15 retained in position thereon by means of a cap 16 secured to the base by means of hold-down bolts 17. The lower ends of the cylinders 14 are seated on the top of the base and leakage therearound is effectively prevented by means of sealing rings, such as O-rings 18. Beneath each cylinder 14 and 15 there are vertical central passages 19 and 20 formed in the base the tops of which are partially closed by bushings 21 and 22. These passages are intersected by horizontal bores 23 and 24, the passage 23 being located beneath the cylinder 14 and the passage 24 beneath the cylinder 15. The passages 23 and 24 provide cylinders for pairs of opposed pistons. Thus the cylinder 23 has reciprocable therein pistons 25 and 26 equipped with sealing or O-rings. Inward movements of these pistons 25 and 26 are limited by their engagement with the bottom of the bushing 21. Outward movements of the pistons 25 and 26 are limited by their engagement with caps or closures 27 and 28 which close the outer ends of the cylinder 23. In a similar manner the cylinder 24 has reciprocable therein pistons 29 and 30. These pistons have their inward movements limited by engagement with the bushing 22 and their outward movements limited by closures 31 and 32. The pistons 25 and 26 constituting the pair beneath the cylinder 14 are urged outwardly by a bowed or flexed leaf spring 33 and, in a similar manner, the pistons 29 and 30 are urged outwardly by a similar spring 34. In the bottom of the base beneath each cylinder there is threadedly mounted a valve seat, the valve seats being indicated at 35 and 36, respectively. These valve seats have valves 37 and 38 movable therein to open and close ports 39 and 40, respectively. The valves 37 and 38 are urged into seating or closing position by means of springs 41 and 42 and have stems 43 and 44 arranged close to but slightly spaced from the springs 33 and 34 under normal conditions. As clearly shown in Fig. 2, the passage 12 is constantly in communication with the outer face of piston 30 by means of ports 45 but the passage 11 communicates only with the exterior face of piston 29 beneath the cylinder 15. Beneath the cylinder 14, as shown in Fig. 3, the passage 11 communicates with the exterior face of piston 25 and with the interior of the valve seat 35 by means of ports 46. The passage 12, however, only communicates with the exterior of piston 26 beneath this cylinder. Cylinder 14, consequently, may from time to time receive liquid from passage 11 and return liquid thereto and similarly cylinder 15 may receive liquid from passage 12 from time to time and return liquid thereto. Ingress and egress to and from the cylinders 14 and 15 with their respective lines or passages 11 and 12 is permitted through ports 47 and 48, respectively, in their respective valve seats 35 and 36.

In each of the cylinders 14 and 15 there are pistons 51 and 52. These pistons have tubular or hollow piston rods 53 and 54 the upper ends of which are normally closed by plugs 55 and 56. On removal of these plugs air may be bled from the system when the system is initially filled with liquid. A cross head 57 extends across the space between the piston rods 53 and 54 and is normally urged downwardly such as by a tension spring 58. The cross head carries sleeves 59 and 60 which are slidable through the cap 16 and which are slidable on the piston rods 53 and 54, respectively, between the pistons 51 and 52 and shoulders 61 formed on the piston rods. These sleeves normally bear on the backs or upper sides of their respective pistons. However, if piston 51 should be elevated higher in its cylinder 14 than piston 52 due to the entry of more liquid into the cylinder 14 than has entered cylinder 15, piston 51 lifts sleeve 59, the cross head 57 and the sleeve 60 upwardly with relation to the piston 52. Conversely, if more liquid has entered the cylinder 15 that has entered the cylinder 14, piston 52 will be elevated, lifting sleeve 60, cross head 57 and sleeve 59 relatively to piston 51. With this arrangement, if either piston 51 or 52 is higher in its cylinder than the other, the effect of the tension spring 58 is to cause that piston to impose pressure on the liquid in its cylinder tending to return liquid in the cylinder to its respective passage. Thus, if piston 51 should be elevated in cylinder 14 higher than piston 52, the effect of the tension spring 58 is to urge piston 51 downwardly tending to expel liquid from cylinder 14 back into passage 11. Until such time as piston 51 reaches the same elevation that piston 52, no pressure is exerted by the spring 58 on piston 52 tending to return liquid from cylinder 15 to passage 12.

The operation and advantages of the construction above described are substantially as follows. If it be assumed that the actuator of the telemotor system is in the nature of a steering wheel and is turned to the right, pressure may be developed in passage 11 to actuate the motor of the telemotor system to turn the rudder accordingly. Liquid from the motor of the telemotor system is returned through passage 12. Conversely, if the steering wheel is turned to the left, pressure may be developed in passage 12 to actuate the motor to turn the rudder to the left and liquid is merely returned from the motor to the actuator through the passage 11. If the temperature of the system increases the liquid in the two lines, of which passages 11 and 12 form parts, will expand and must be relieved. If the actuator is in a neutral position, the expansion may be effective to increase the pressure in both passages 11 and 12. When this exceeds a predetermined degree, all pistons 25, 26, 29 and 30 will be urged into their innermost positions, flexing the springs 33 and 34 and causing these springs to engage the stems 43 and 44 on their respective valves 37 and 38, thus unseating the valves and allowing liquid from both passages to enter the cylinders 14 and 15. This will cause both pistons 51 and 52 to be elevated in their cylinders 14 and 15 and as the amounts of liquid released from the passages 11 and 12 into the cylinders is equal under these conditions both pistons will be elevated the same amount and an equal effort will be exerted thereon by the spring 58 to return the liquid to the passages whenever the temperature of the telemotor system falls causing the liquid in the lines to contract.

It may occur, however that, during the period of temperature rise, right rudder is being more or less constantly applied or that right rudder is being applied a much greater proportion of the time than left rudder. Whenever pressure, regardless of its magnitude, is being applied to the passage 11 alone this merely is effective to actuate pistons 25 and 29. When pistons 25 and 29 alone move inwardly the springs 33 and 34 are slightly flexed but they are not bowed sufficiently to engage and depress the valve stems 43 and 44. Consequently, under these conditions passage 11 is locked or closed against egress so that pressure may be transmitted from the actuator to the motor. If under these conditions a temperature rise takes place expanding the liquid in the lines and causing pressure to be developed in the passage 12 due to the expansion and the pressure exceeds a predetermined degree, pistons 26 and 30 will be forced inwardly by the increase of pressure and cooperate with the inwardly forced pistons 25 and 29 to flex or bow the springs 33 and 34 sufficiently to allow egress from the lines into the cylinders. Under such circumstances the pressure increase in the passage 12 due to the increase in temperature may be relatively small and consequently only a small amount of liquid will flow therefrom into the cylinder 15. When this small amount has passed from the passage 12 to cylinder 15 pressure in passage 12 is reduced allowing pistons 26 and 30 to return to their outermost positions and thus allowing the valves 37 and 38 to close. Prior to the closing, however, inasmuch as the pressure in the passage 11 was quite high due not only to the temperature expansion of the liquid therein but also due to the continued application of right rudder, a considerable quantity of liquid may be passed from this passage into the cylinder 14. Under these circumstances piston 51 will be elevated in its cylinder 14 higher than piston 52 and as previously explained spring 58 is effective on piston 51 urging the excess of liquid in cylinder 14 to be expelled therefrom without being effective on piston 52. Consequently, on a subsequent decrease in temperature of the telemotor system causing the liquid in the lines to contract, piston 51 will first be effective to return liquid from cylinder 14 back to passage 11 and all excess liquid received by cylinder 14 will be returned to passage 11 until the pistons 51 and 52 have reached the same elevation. Thereafter the spring 58 will urge both pistons downwardly with equal pressure, returning liquid equally to the lines 11 and 12. In this manner the relationship or orientation of the actuator with relation to the motor can be preserved and, although there may be temporary displacements of the actuator with relation to the motor, eventually the relationship will be automatically returned by the compensator inasmuch as the compensator is automatically effective to develop pressure in that cylinder which has received the most liquid from its respective passage urging the liquid to return to its passage as soon as the pressure in the cylinder exceeds the pressure in the passage.

From the above described construction it will be appreciated that an improved compensator is provided wherein each line or conduit of the telemotor system has its own cylinder or reservoir. An increase in the pressure in both lines beyond a predetermined degree is required to cause the pistons 25, 26, 29 and 30 to open the valves 37 and 38 to permit escape of liquid from the lines into their respective cylinders. A mere increase in the pressure in one line is insufficient to open the valves 37 and 38 regardless of how great such pressure may be. If the valves 37 and 38 are open during periods when the pressure in one line is in excess of that of the other, more liquid will flow from the high pressure line into its cylinder than from the low pressure line. Although this may temporarily disturb the orientation of the actuator with relation to the motor it will ultimately be automatically restored in that pressure is developed in that cylinder which has received the most liquid tending to return liquid to the line from which it has been received prior to returning liquid to the other or low pressure line. Consequently, ultimately the orientation of the actuator with relation to the motor will be restored.

It will be observed that the valve seats 35 are accessible from the bottom of the base and as they are threaded into the base the adjustment of the valve seats and the stems 43 and 44 with relation to the springs 33 and 34 can be easily accomplished. The compression springs 41 and 42 which urge the valves 37 and 38 toward their seats and which mildly oppose return of liquid from the cylinders to their respective passages, are seated on plugs 62 and 63 which are threaded into the bottoms of the valve seats and can be adjusted to vary the compression of these springs.

The use of the opposed pistons 25, 26, 29 and 30, influenced by the pressures in the passages 11 and 12 and the flexed springs 33 and 34 therebetween, provides a very simple yet highly effective means for opening the valves 37 and 38 only when the pressures in the passages 11 and 12 both exceed a predetermined degree. As will be appreciated from an inspection of Figs. 2 and 3, if pressure in either passage 11 or 12 increases without there being an increase in the other passage, such increase in pressure in one passage alone, regardless of its magnitude, is incapable of opening either valve 37 or 38.

Various changes may be made in the details of the construction without departing from the spirit and scope of the invention as defined by the appended claims.

I claim:

1. In a closed hydraulic system wherein there are two lines conducting fluid between an actuator and a motor, a compensator comprising two cylinders, means providing for communication between each cylinder and its respective line, means controlling ingress to each cylinder from its respective line so that fluid may flow from a line into its cylinder only when the pressures in both lines exceeds a predetermined degree, pistons in each cylinder, and means for applying pressure to only that piston which has been displaced more by the ingress of fluid from its line so as to urge fluid to return to its line.

2. In a closed hydraulic system wherein there are two conduits conducting fluid between an actuator and a motor, a compensating cylinder for each conduit, means permitting fluid to flow from a conduit to its respective cylinder only when pressure in both conduits exceeds a predetermined degree, and means for imposing a pressure on the fluid urging it to return to its conduit in only that cylinder that has received more fluid from its conduit.

3. A compensator for closed hydraulic systems comprising a pair of cylinders each of which is adapted to be connected to a conduit of a telemotor system so as to receive fluid therefrom, means for admitting fluid from each conduit to its respective cylinder only when the pressures in both conduits exceeds a predetermined degree but permitting flow from either cylinder into its respective conduit whenever the pressure in the cylinder exceeds the pressure in its conduit, and means for imposing pressure on the fluid in only that cylinder which has received more fluid from its conduit.

4. A compensator for closed hydraulic systems comprising a pair of cylinders each of which is adapted to be connected to a conduit of a telemotor system so as to receive fluid therefrom, a check valve for each cylinder opposing ingress of fluid from each conduit into its respective cylinder but permitting flow in the opposite direction, means for unseating each check valve only when the pressures in both conduits exceeds a predetermined degree, and means for imposing pressure on the fluid in only that cylinder which has received more fluid from its conduit.

5. A compensator for closed hydraulic systems comprising a pair of cylinders each of which is adapted to be connected to a conduit of a telemotor system so as to receive fluid therefrom, a check valve for each cylinder opposing ingress of fluid from each conduit into its respective cylinder but permitting flow in the opposite direction, means for unseating each check valve comprising a pair of opposed pistons reciprocable between limits and subject to the pressures in the conduits respectively, and a bowed spring between the pistons arranged to engage and unseat the check valve only when both pistons have been actuated by the pressures in their conduits exceeding a predetermined degree.

6. A compensator for closed hydraulic systems comprising a pair of cylinders each of which is adapted to be connected to a conduit of a telemotor system so as to receive fluid therefrom, a check valve for each cylinder opposing ingress of fluid from each conduit into its respective cylinder but permitting flow in the opposite direction, means for unseating each check valve comprising a pair of opposed pistons reciprocable between limits and subject to the pressures in the conduits respectively, a bowed spring between the pistons arranged to engage and unseat the check valve only when both pistons have been actuated by the pressures in their conduits exceeding a predetermined degree, and means for imposing pressure on the fluid in only that cylinder which has received more fluid from its conduit.

7. A compensator for closed hydraulic systems comprising a pair of cylinders each of which is adapted to be connected to a conduit of a telemotor system so as to receive fluid therefrom, a pair of opposed pistons beneath each cylinder, a bowed spring between each pair of opposed pistons, a check valve arranged to permit flow from each cylinder to its respective conduit when the pressure in the cylinder exceeds the pressure in the conduit but on closing serving to prevent flow from the conduit to the cylinder, each check valve being arranged to be engaged by the bowed springs and unseated when the pairs of opposed pistons are both actuated.

8. A compensator for closed hydraulic systems comprising a pair of cylinders each of which is adapted to be connected to a conduit of a telemotor system so as to receive fluid therefrom, a pair of opposed pistons beneath each cylinder, a bowed spring between each pair of opposed pistons, a check valve arranged to permit flow from each cylinder to its respective conduit when the pressure in the cylinder exceeds the pressure in the conduit but on closing serving to prevent flow from the conduit to the cylinder, each check valve being arranged to be engaged by the bowed springs and unseated when the pairs of opposed pistons are both actuated, pistons in the cylinders, a cross head between the pistons, and means providing a sliding connection between the cross head and each piston whereby the cross head will be only effective on the piston that has been displaced the most until such time as the pistons in the cylinders occupy positions of equal displacement.

9. In a compensator for closed hydraulic systems, a cylinder, a pair of opposed pistons, means for subjecting said opposed pistons to pressures in the conduits of a telemotor system, means limiting movements of the pistons, bowed springs between the pistons and a check valve arranged to be engaged by the bowed springs and opened only when both pistons have been actuated and thus permit flow from a conduit into the cylinder, said check valve being arranged to permit flow from the cylinder to the conduit whenever the pressure in the cylinder exceeds that existing in the conduit.

10. In a compensator for closed hydraulic systems, a cylinder, a pair of opposed pistons, means for subjecting said opposed pistons to pressures in the conduits of a closed hydraulic system, means limiting movements of the pistons, means interposed between the pistons so as to be affected by the inward movements thereof, and a check valve arranged to be engaged by said means and opened only when both pistons have been actuated to permit flow from a conduit into the cylinder, said check valve being arranged to permit flow from the cylinder to the conduit whenever the pressure in the cylinder exceeds that existing in the conduit.

11. In a compensator for closed hydraulic systems, a cylinder, a pair of opposed pistons, means for subjecting said opposed pistons to pressures in the conduits of a closed hydraulic system, means limiting movements of the pistons, means interposed between the pistons and movable in a direction transverse to the direction of movement of the pistons when the pistons are moved inwardly by the pressures to which they are subjected, and a check valve arranged to be engaged by said means and opened only when both pistons have been actuated to thus permit flow from a conduit into the cylinder, said check valve being arranged to permit flow from the cylinder to the conduit whenever the pressure in the cylinder exceeds that existing in the conduit.

12. In a closed hydraulic system wherein there are two conduits conducting fluid between an actuator and a motor, two compensating cylinders one for each conduit, means providing for ingress of fluid from each conduit to its respective cylinder, pistons in the cylinders, a cross head between the pistons, means providing a sliding connection between the cross head and each piston whereby the cross head will be only effective on the piston that has been displaced the most until such time as the pistons in the cylinders occupy positions of equal displacement, and means effective on the cross head to cause the pistons to exert pressure on the fluid in the cylinders urging the fluid to return from the cylinders to their respective conduits.

References Cited in the file of this patent

UNITED STATES PATENTS

| | | |
|---|---|---|
| 375,674 | Greene | Dec. 27, 1887 |
| 2,383,180 | Ellinwood | Aug. 21, 1945 |
| 2,397,270 | Kelly | Mar. 26, 1946 |
| 2,551,274 | MacDuff | May 1, 1951 |